United States Patent Office 2,698,341
Patented Dec. 28, 1954

2,698,341

ACIDOLYSIS OF METHYLAL WITH CARBOXYLIC ACID ANHYDRIDES

Richard D. Kleene and William B. Hughes, Bartlesville, Okla., assignors to Cities Service Research and Development Company, New York, N. Y., a corporation of New Jersey No Drawing. Application August 17, 1951,
Serial No. 242,439

4 Claims. (Cl. 260—496)

This invention relates to the acidolysis of methylal, and more particularly to the preparation of methoxy methyl esters of lower aliphatic acids.

We have discovered that methylal may be reacted, under anhydrous conditions and in the presence of an acid catalyst, with lower aliphatic acid anhydrides to give good yields of a mixture of methyl esters and methoxymethyl esters, which can easily be separated by fractional distillation into pure compounds. The reaction is carried out at reflux temperatures for a period of time sufficient to permit the reaction to go to completion. Ordinarily, six hours of refluxing is sufficient to give good yields of the desired esters, but heating may be continued for longer periods without deleterious effects. It is important, however, that no water be present during the reaction, since, in the presence of water, the methylal will be hydrolyzed to methanol and formaldehyde, reducing the ester yield. The methoxymethyl esters produced in our new process are excellent solvents for cellulose acetate, and show promise as plasticizers and as intermediates for other organic syntheses.

In order that those skilled in the art may more fully appreciate our invention and the method of carrying it out, the following examples are given.

Example I

To 102.1 grams of acetic anhydride 75 grams of dry, methanol-free methylal, and approximately 0.1 gram of p-toluene sulfonic acid were added. This mixture was refluxed for 6 hours, and then fractionated through a column having about a 15 plate fractionating efficiency. A fraction boiling at 117–118° C. was collected, which weighed 81 grams and amounted to 78% of the theoretical yield of methoxymethyl acetate if the reaction proceeded according to the following equation:

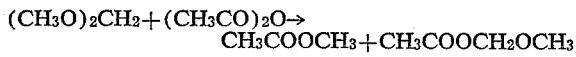
$(CH_3O)_2CH_2 + (CH_3CO)_2O \rightarrow$
$CH_3COOCH_3 + CH_3COOCH_2OCH_3$ The fact that the 117–118° cut was methoxymethyl acetate is confirmed by the following physical data found as compared with the literature values for this compound.

|  | Found | Literature |
|---|---|---|
| Boiling Point, ° C | 117–118 | 117–118 |
| Mol. Wt | 102.4 | 104 |
| n25/D | 1.3917 | 1.3980 |
| D20/4 | 1.018 | 0.989 |
| Mol. Refractivity | 23.21 | 23.97 |

Example II

The procedure of Example I was followed, substituting 1 gram molecular weight of propionic anhydride for the acetic anhydride of Example I. A cut boiling between 130 and 133° C. was collected on fractionation. This cut had a strong odor of propionic acid, so it was washed with a 10% sodium bicarbonate solution followed by several water washes. The crude product was dried over magnesium sulfate, and refractionated, a cut boiling at 133° C. being collected, which amounted to a 65% yield of methoxymethyl propionate based on the propionic anhydride used. 31% of the starting propionic anhydride was recovered from a cut boiling between 167 and 169° C. Physical data for the 133° cut were determined and compared with the literature values for methoxymethyl propionate as follows:

|  | Found | Literature |
|---|---|---|
| Boiling point, ° C | 133 | 133 |
| Mol. wt | 117 | 118 |
| D20/4 | 0.9886 | 0.9872 |

Example III

The procedure of Example I was followed, substituting n-butyric anhydride for acetic anhydride. In this case the cut boiling between 150 and 155° C. was collected, washed with sodium bicarbonate solution followed by water, dried, and redistilled, the cut boiling at 152° C. being collected. Physical data for this cut compared with literature values for methoxymethyl butyrate are as follows:

|  | Found | Literature |
|---|---|---|
| Boiling Point | 152 | 151–152 |
| Mol. Wt | 131 | 132 |
| D20/4 | 0.9740 | 0.9747 |

The yield of methoxymethyl butyrate was 62% based on n-butyric anhydride. 27.6% of the starting n-butyric anhydride was recovered unreacted as a cut boiling at 190° to 192° C.

All the esters produced by the synthesis described above are mobile, pleasant smelling liquids which are substantially insoluble in water. They are all excellent solvents for cellulose acetate and should find ready acceptance as solvents and plasticizers.

Having now described our invention, what is claimed is:

1. The process of synthesizing methoxymethyl esters comprising reacting methylal and an aliphatic acid anhydride under substantially anhydrous conditions and at reflux temperatures in the presence of a trace of acid catalyst, and recovering a methoxymethyl ester from the reaction products.

2. The process according to claim 1 in which the acid anhydride is acetic anhydride, and the ester is methoxymethyl acetate.

3. The process according to claim 1 in which the acid anhydride is propionic anhydride, and the ester is methoxymethyl propionate.

4. The process according to claim 1 in which the acid anhydride is n-butyric anhydride, and the ester is methoxymethyl butyrate.

References Cited in the file of this patent

UNITED STATES PATENTS

| Number | Name | Date |
|---|---|---|
| 2,416,024 | Senkus | Feb. 18, 1947 |
| 2,423,783 | Lippincott | July 8, 1947 |

OTHER REFERENCES

Claisen: Berichte 31, 1018.
Post et al.: J. Organic Chem., vol. 2, pages 260–266 (1937).
Fieser et al.: "Organic Chemistry" (D. C. Health and Co., Boston, 1944), page 221.